United States Patent [19]

Sakurai et al.

[11] Patent Number: 4,474,008
[45] Date of Patent: Oct. 2, 1984

[54] EXHAUST GAS RECIRCULATION SYSTEM FOR DIESEL ENGINE

[75] Inventors: Shigeru Sakurai; Shigeki Hamada, both of Hiroshima, Japan

[73] Assignee: Toyo Kogyo Co., Ltd., Hiroshima, Japan

[21] Appl. No.: 482,844

[22] Filed: Apr. 7, 1983

[30] Foreign Application Priority Data

Apr. 9, 1982 [JP] Japan .................. 57-52382[U]

[51] Int. Cl.³ .................................. F02M 25/06
[52] U.S. Cl. ........................... 60/605; 60/611; 123/569; 123/571
[58] Field of Search ........... 123/569, 571; 60/605, 60/611, 278

[56] References Cited

U.S. PATENT DOCUMENTS

| | | | |
|---|---|---|---|
| 3,925,989 | 12/1975 | Pustelnik | 60/605 X |
| 4,075,990 | 2/1978 | Ribeton | 60/611 X |
| 4,181,109 | 1/1980 | Wake et al. | 123/569 |
| 4,333,438 | 6/1982 | Perez et al. | 123/569 |
| 4,350,013 | 9/1982 | Yoshiba | 60/605 |
| 4,369,753 | 1/1983 | Sugiyama | 123/569 |
| 4,387,693 | 6/1983 | Romblom | 123/569 |
| 4,387,694 | 6/1983 | Yoshiba et al. | 123/571 |
| 4,388,912 | 6/1983 | Kimura et al. | 123/569 |
| 4,428,355 | 1/1984 | Yokooku | 123/571 |

FOREIGN PATENT DOCUMENTS

| | | | |
|---|---|---|---|
| 2529208 | 2/1977 | Fed. Rep. of Germany | 123/571 |
| 141825 | 12/1978 | Japan | 60/605 |
| 13828 | 2/1979 | Japan | 60/605 |
| 37716 | 9/1980 | Japan | 123/571 |
| 159544 | 12/1981 | Japan | 123/569 |

Primary Examiner—Wendell E. Burns
Attorney, Agent, or Firm—Burns, Doane, Swecker and Mathis

[57] ABSTRACT

An exhaust gas recirculation (EGR) system for a diesel engine comprising an EGR control valve for regulating the flow of exhaust gases to be recirculated from an engine exhaust system back to an engine air intake system. When the exhaust gas recirculation is to be interrupted, the EGR control valve is closed a predetermined time after the opening of a throttle valve used in the air intake system for regulating the flow of air towards the engine. For this purpose, delay valves are utilized in association with the throttle valve and the EGR control valve.

8 Claims, 4 Drawing Figures

EXHAUST GAS RECIRCULATION SYSTEM FOR DIESEL ENGINE

BACKGROUND OF THE INVENTION

This invention relates to an exhaust gas recirculation system for an internal combustion engine, particularly a diesel engine.

Hitherto, an exhaust gas recirculation (EGR) system for recirculating a portion of exhaust gases, discharged from an internal combustion engine, to the air intake system of the same engine has been utilized as one of the effective means to minimize the emission of an obnoxious $NO_x$ component contained in the exhaust gases. When it comes to a diesel engine, no throttle valve is employed in an air intake system because of the peculiar structural design and, therefore, the difference in pressure between the air intake system and the exhaust system is so small that difficulty is encountered in acquiring a necessary quantity of exhaust gases to be recirculated through the EGR system. This is a serious problem because the diesel engine requires a large quantity of exhaust gases to be recirculated in order for the emission of the $NO_x$ component of the exhaust gases to be effectively minimized in view of the fact that the diesel engine requires a relatively large amount of air supply.

Apart from the above, the use of a supercharger in the air intake system is practised to increase the engine power output. However, in such a supercharged engine, since the pressure in the air intake system is apt to be higher than that described above, there is a problem in that a necessary quantity of the exhaust gases to be recirculated can not be obtained. Although this problem appears to be solved when design is made to supply a portion of the exhaust gases into the air intake system at a position upstream of the supercharger, this design is problematic in that a blower tends to be soiled with carbon component of the exhaust gases, and therefore, it is necessary to employ such an alternative design to supply the recirculated exhaust gases into the air intake system at a position downstream of the supercharger, with the problem consequently far from being solved.

Against the first mentioned problem, it has been suggested to install a throttle valve in the air intake system for reducing the rate of flow of air being sucked, thereby to reduce the pressure inside the air intake system when the throttle valve is closed during the recirculation of the exhaust gases, wherefor the difference in pressure between the air intake system and the exhaust system is increased to secure the necessary quantity of the exhaust gases to be recirculated.

Against the second mentioned problem, it can be contemplated to interrupt the supply of the supercharged air during the recirculation of the exhaust gases to allow the pressure inside the air intake system to decrease in order to secure the necessary quantity of the exhaust gases to be recirculated. Where the mere interruption of the supercharged air supply would not ensure the necessary quantity of the exhaust gases to be recirculated, the use of a throttle valve in the air intake system can be contemplated to allow the throttle valve to be closed a predetermined degree simultaneously with the interruption of the supercharged air supply so that the pressure inside the air intake system can be further reduced in order to secure the necessary quantity of the exhaust gases to be recirculated.

Specifically, in the design wherein the pressure inside the air intake system is reduced during the recirculation of the exhaust gases in order to secure the necessary quantity of the exhaust gases to be recirculated, the necessary quantity of the exhaust gases to be recirculated can be obtained by controlling the pressure inside the fuel intake system. However, where the exhaust gas recirculation is to be interrupted, for example, curing the exhaust gas recirculation being effected, that is, while an EGR control valve in the EGR system is opened on the one hand and the throttle valve in the air intake system is closed the predetermined degree on the other hand, the closure of the EGR control valve before the complete opening of the throttle valve creates an unexpected negative pressure inside the air intake system downstream of the throttle valve, resulting in that the temperature of the air being compressed in the engine cylinder will not increase sufficiently and the failure to ignite fuel oil sprayed into the engine cylinder may occur with the consequence of emission of exhaust gases containing a relatively large amount of unburned compound such as HC. Even if the failure to ignite the fuel oil does not occur and the latter is barely ignited, the temperature of the air being compressed may be so low as to result in the retarded ignition with the consequently increased possibility of occurrence of engine knocking. Accordingly, where the EGR system is to be employed in association with the diesel engine, countermeasures have to be taken to avoid the emission of a relatively large amount of the unburned exhaust gas components and also the occurrence of the engine knocking which would be apt to occur about the time the exhaust gas recirculation is to be interrupted.

On the other hand, in the diesel engine, although the emission of the $NO_x$ component contained in the exhaust gases can be reduced when the exhaust gas recirculation is effected, the emission of smoke tends to be inversely increased. Accordingly, these incompatible problems have to be resolved simultaneously in order to provide a clean diesel engine. In this respect, experiments have shown that the emission of smoke can be minimized when the compression ratio is increased by way of, for example, increasing the supercharged pressure, and, therefore, the minimization of both the emission of the $NO_x$ component and the emission of the smoke can be accomplished if the EGR system and the supercharger are coordinately controlled.

Moreover, considering the fact that, when the exhaust gas recirculation is abruptly switched on and off alternately, an abrupt change in torque will occur with the result that the drivability will be reduced. In view of this, it is advisable for the change-over of the exhaust gas recirculation to be carried out in such a way as to gradually increase or decrease the rate of flow of the exhaust gases being recirculated.

SUMMARY OF THE INVENTION

Accordingly, this invention has for its essential object to provide an exhaust gas recirculation (EGR) system provided with means for reducing the rate of flow of air towards the engine, when the exhaust gas recirculation is to be effected, to reduce the pressure inside the air intake system, thereby increasing the difference in pressure between the air intake system and the exhaust system to secure a necessary quantity of exhaust gases to be recirculated whereby the emission of a relatively large amount of the obnoxious components of the exhaust gases and the possible occurrence of engine knocking, which would occur at the time of change-over of the exhaust gas recirculation can be minimized.

Another important object of this invention is to provide an EGR system of the type referred to above, which is effective to avoid any possible reduction in drivability resulting from the abrupt change in torque.

A further object of this invention is to provide an EGR system of the type referred to above, which when used in combination with the supercharger, is effective to minimize the emission of both the $NO_x$ component contained in the exhaust gases and the smoke.

In order to accomplish the above described objects, this invention is directed to an EGR system which comprises an EGR passage means extending from an exhaust passage means to an air intake passage means and having an EGR control valve means, and means disposed in the air intake passage means at a location upstream of the opening of the EGR passage means into the air intake passage means for reducing the rate of flow of air towards the engine thereby to reduce the pressure inside the air intake passage means whereby, when the exhaust gas recirculation is to be effected, said EGR control valve means is opened on the one hand and the reducing means is brought into operation on the other hand. In accordance with this invention, the EGR system of the construction described above is provided with a time lag providing means for delaying the closing operation of the EGR control valve means relative to the release of the reducing means when the exhaust gas recirculation is interrupted.

By the provision of the time lag providing means, it is possible to avoid any possible development of an excessive negative pressure inside the air intake passage means which would otherwise result from the premature closure of the EGR control valve means, thereby avoiding the increased emission of the obnoxious compounds resulting from the failure to ignite the fuel oil and also the increased occurrence of the engine knocking resulting from the retarded ignition of the fuel oil.

In addition, the provision of the time lag providing means makes it possible to avoid any possible abrupt change in torque and, hence, the reduction in drivability because the EGR control valve means can be closed in such a way as to gradually decrease the rate of flow of exhaust gases being recirculated as a result of the increase of the pressure inside the air intake passage means, when the exhaust gas recirculation is to be interrupted.

Where the EGR system of this invention is used in a supercharger-equipped diesel engine, the generation of the $NO_x$ component and that of smoke can be suppressed because, as a result of the gradual increase of the supercharged pressure, the supercharged pressure increases while the exhaust gases are being recirculated through the EGR passage means.

BRIEF DESCRIPTION OF THE DRAWINGS

These and other objects and features of this invention will become clear from the following detailed description thereof taken in conjunction with preferred embodiments thereof with reference to the accompanying drawings, in which:

FIG. 3 is a graph showing the relationship between the load and the engine speed.

DETAILED DESCRIPTION OF THE EMBODIMENTS

Figure 1:
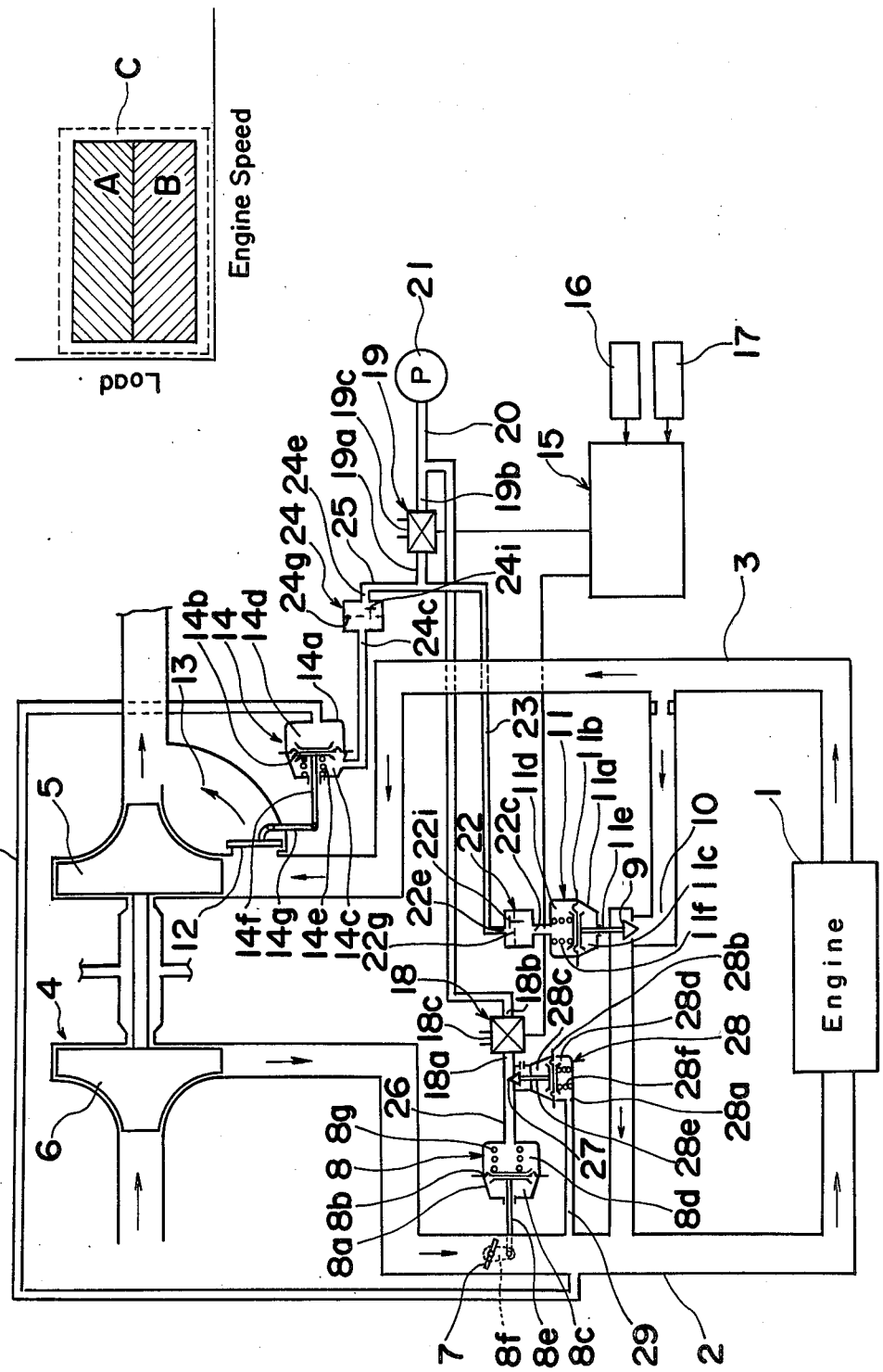
FIG. 1 is a schematic diagram showing an EGR system used in combination with a supercharged engine according to one preferred embodiment of this invention.

Before the description of the embodiments of this invention proceeds, it is to be noted that like parts are designated by like reference numerals throughout the accompanying drawings.

Figure 2:
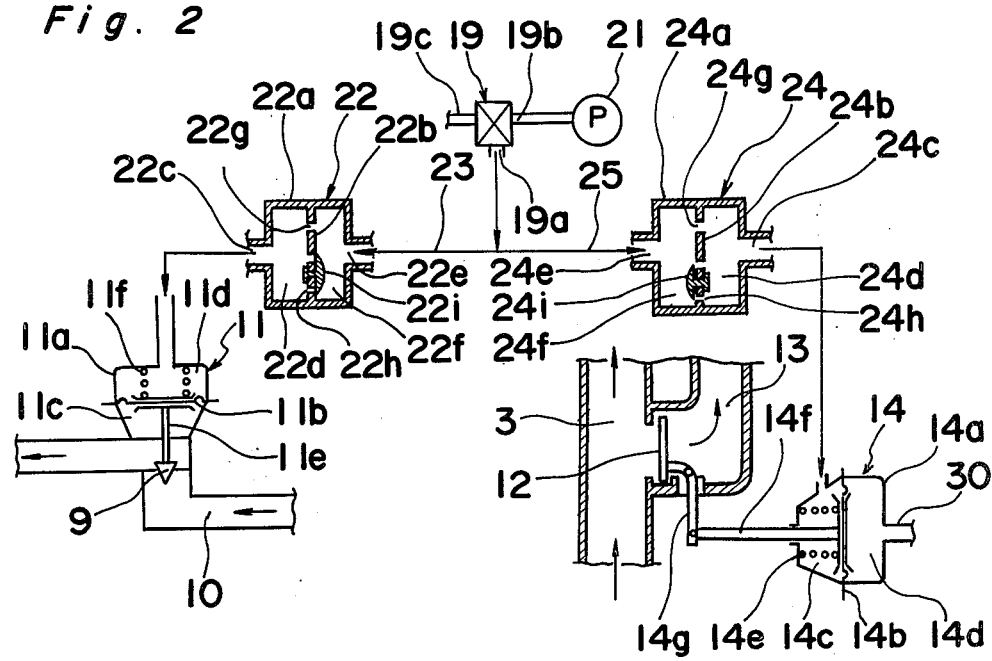
FIG. 2 is a schematic diagram showing in detail an essential portion of the system shown in FIG. 1.

Referring first to FIGS. 1 and 2, an automobile power plant comprises an engine 1 having an air intake passage 2 for the introduction of air into an engine cylinder and an exhaust passage for the discharge of exhaust gases from the engine cylinder to the atmosphere, and a turbocharger 4 including an exhaust-gas turbine 5 disposed in the exhaust passage 3 and a blower 6 drivingly coupled with the turbine 5 and disposed in the air intake passage 2.

The air intake passage 2 has a throttle valve 7 disposed therein at a position downstream of the blower 6 with respect to the direction of flow of air towards the engine cylinder for regulating the flow of air therethrough and adapted to be controlled by a first diaphragm valve assembly 8.

The power plant also comprises an EGR passage 10 extending from a portion of the exhaust passage 3 between the engine 1 and the turbine 5 to a portion of the air intake passage 2 between the engine 1 and the throttle valve 7 and has an EGR control valve 9 disposed therein for regulating the flow of a portion of the exhaust gas therethrough, said control valve 9 being adapted to be controlled by an EGR diaphragm valve assembly 11.

The exhaust passage 3 has a bypass passage 13 bypassing the turbine 5, and the bypass passage 13 is adapted to be selectively closed and opened by a west gate valve 12 which is controlled by a second diaphragm valve assembly 14.

The power plant further comprises a microcomputer 15 for automobile use for controlling both a first electromagnetic three-way valve 19 for the control of the first diaphragm valve assembly 14 in dependence on the operating condition of the engine 1 which is detected by combined pieces of information indicative of the engine speed, sensed by an engine speed sensor 16, and the rate of injection of fuel sensed by a fuel sensor 17, respectively. The first and second electromagnetic three-way valve 18 and 19 may be of the same construction, and each of them has an inlet 18a or 19a, an outlet 18b or 19b, and an atmospheric port 18c or 19c, the outlets 18b and 19b of the respective electromagnetic valves 18 and 19 being communicated to a vacuum pump 21 through a common duct 20.

The inlet 19a of the second three-way valve 19 is fluid-connected to the EGR diaphragm valve assembly 11, as will be described latter, through a suction passage 23 having a first delay valve assembly 22 disposed therein. The inlet 19a of the same three-way valve 19 is also fluid-connected to the second diaphragm valve assembly 14, as will be described later, through a suction passage 25 having a second delay valve assembly 24 disposed therein.

The first diaphragm valve assembly 8 comprises a casing 8a having its interior divided by a diaphragm member 8b into atmospheric and negative chambers 8c and 8d, an operating rod 8e having one end operatively coupled to the throttle valve 7 through a link 8f and the other end movably extending through the atmospheric chamber 8c and rigidly secured to the diaphragm member 8b, and a compression spring 8g housed within the negative chamber 8d. It is the negative chamber 8d to which the inlet 18a of the first electromagnetic three-way valve 18 is fluid-connected through a suction passage 26.

The suction passage 26 is selectively closed and opened by a feedback valve 27 disposed therein and adapted to be controlled by a third diaphragm valve assembly 28. The diaphragm valve assembly 28 for the control of the feedback valve 27 comprises a casing 28a having its interior divided by a diaphragm member 28b into atmospheric and negative chambers 28c and 28d, an operating rod 28e having one end coupled to the feedback valve 27 and the other end extending movably through the atmospheric chamber 28c and rigidly secured to the diaphragm member 28b, and a compression spring 28f housed within the negative chamber 28d. The negative chamber 28d is fluid-connected through a suction passage 29 to a portion of the air intake passage 2 downstream of the throttle valve 7.

The EGR diaphragm valve assembly 11 comprises a casing 11a having its interior divided by a diaphragm member 11b into atmospheric and negative chambers 11c and 11d, an operating rod 11e having one end connected to the EGR control valve 9 and the other end extending movably through the atmospheric chamber 11c and rigidly secured to the diaphragm member 11b, and a compression spring 11f housed within the negative chamber 11d. The negative chamber 11d is communicated with an inlet 22c of the first delay valve assembly 22 which is in turn communicated with the second electromagnetic three-way valve 19 through the suction passage 23 as hereinbefore described.

The second diaphragm valve assembly 14 comprises a casing 14a having its interior divided by a diaphragm member 14b into first and second working chambers 14c and 14d, a compression spring 14e housed in the first working chamber 14c, and an operating rod 14f having one end operatively coupled to the west gate valve 12 through a link 14g and the other end extending movably through the first working chamber 14c and rigidly secured to the diaphragm member 14b. The first and second working chambers 14c and 14d are fluid-connected to an inlet 24c of the second delay valve assembly 24 and to a portion of the air intake passage 2 downstream of the throttle valve 7 through a suction passage 30, respectively.

As best shown in FIG. 2, the first and second delay valve assemblies 22 and 24 may be of the same construction, and each of them comprises a casing 22a or 24a having its interior divided by a partition wall 22b or 24b into an inlet chamber 22d or 24d adjacent the respective inlet 22c or 24c and an outlet chamber 22f or 24f adjacent the respective outlet 22e or 24e. The partition wall 22b or 24b in each of the delay valve assemblies 22 and 24 has a pair of spaced apertures 22g and 22h or 24g and 24h defined therein. It is, however, to be noted that the aperture 22g in the first delay valve assembly 22 has a smaller bore size than the aperture 24g in the second delay valve assembly 24 whereas the apertures 22h and 24h in the respective delay valve assemblies 22 and 24 are of the same bore size. Each of the first and second delay valve assemblies 22 and 24 also comprises a check valve member 22i or 24i operable to allow the passage of fluid medium from the associated inlet 22c or 24c to the associated outlet 22e or 24e through the respective aperture 22i or 24i, but to interrupt it from the associated outlet 22e or 24e to the associated inlet 22c or 24c therethrough. In this construction, the delay time t1 of the first delay valve assembly 22 is larger than the delay time t2 of the second delay valve assembly 24.

The microcomputer 15 is so designed as to control the three-way valves 18 and 19 in such a way that, with respect to the EGR regions A and B shown in FIG. 3, which are determined in dependence on a combination of the engine speed and the load on the engine, the throttle valve 7 can be closed on the one hand and the EGR control valve 9 can be completely closed on the other hand during the region B to allow the exhaust gas recirculation to be positively performed by the action of the negative pressure inside the air intake passage, but during the region B the throttle valve 9 can be completely opened on the one hand and the EGR control valve 9 can be opened on the other hand. The region C shown in FIG. 3 is the region wherein the exhaust gas recirculation is performed by the time the EGR control valve 9 is closed by the first delay valve assembly 22, and the difference between the delay times t1 and t2 referred to hereinbefore is set at a region slightly smaller than the region C.

With the EGR system constructed as hereinbefore described, it is clear that, during an engine operating condition falling within the region B in FIG. 3, and when the west gate valve 12 is held in a closed position, a supercharged air is supplied from the blower 6 then driven by the turbine 5.

When the exhaust gas recirculation is to be effected during the supply of the supercharged air, a portion of the exhaust gases to be recirculated would not readily enter because the supercharged pressure is high. However, when in response to signals from the microcomputer 15 the three-way valves 18 and 19 are operated to communicate the inlet 18a with the outlet 18b and the inlet 19a with the outlet 19b, respectively, the throttle valve 7 is closed a predetermined degree and, at the same time, the check valve members 22i and 24i in the respective delay valve assemblies 22 and 24 open the associated apertures 22h and 24h, thereby causing the diaphragm valve assemblies 11, 14 and 8 to be simultaneously operated to lower the supercharged pressure, throttle the flow of air being sucked and reduce the suction pressure wherefore the exhaust gas recirculation is initiated.

Where the exhaust gas recirculation is to be interrupted from the region B, and when for this purpose the three-way values 18 and 19 are operated in response to signals from the microcomputer 15 to communicate the inlet 18a with the atmospheric port 18c and the inlet 19a with the atmospheric port 19c, respectively, the negative chamber 8d of the first diaphragm valve assembly 8 is first equalized to the atmospheric pressure with the throttle valve 7 consequently opened, the first working chamber 14c of the second diaphragm valve assembly 14 is then equalized by the second delay valve assembly 24 to the atmospheric pressure, with the west gate valve 12 consequently closed, and finally, the negative chamber 11d of the EGR diaphragm valve assembly 11 is equalized by the first delay valve assembly 22 to the atmospheric pressure with the EGR control valve 9 consequently closed. In this way, the throttle valve 7 having no delay valve assembly is first opened, and after the supercharging has been initiated subsequent to the closure of the west gate valve 12, the EGR control valve 9 is closed to interrupt the exhaust gas recirculation.

Where the exhaust gas recirculation is, however, to be interrupted during the engine operating condition falling within the region A (a high load or high speed operating condition with the throttle valve opened), and when for this purpose the three-way valve 19 is operated in response to a signal from the microcomputer 15 to communicate the inlet 19a with the atmospheric port 19c, the first working chamber 14c of the diaphragm valve assembly 14 is first equalized by the second delay valve assembly 24 to the atmospheric pressure with the west gate valve 12 consequently closed and the negative chamber 11d of the EGR diaphragm valve assembly 11 is subsequently equalized by the first delay valve assembly 22 to the atmospheric pressure with the EGR control valve 9 consequently closed. In this way, the west gate valve 12 is first closed to effect the supercharging and, after a time corresponding to the difference between the respective delay times of the first and second delay valve assemblies 22 and 24, the EGR control valve 9 is closed to interrupt the exhaust gas recirculation.

Thus, it is clear that, since when the exhaust gas recirculation is to be interrupted, the EGR passage is closed after the pressure inside the air intake passage has increased, any possible development of the pressure inside the air intake passage downstream of the throttle valve to an excessive negative pressure can be avoided and both the increased emission of HC and CO components of the exhaust gases resulting from the failure to ignite the fuel due to insufficient temperature of the air being compressed in the engine cylinder and the increased possibility of the occurrence of engine knocking resulting from the retarded ignition of the fuel can also be avoided.

It is also clear that, since the EGR control valve is closed to interrupt the exhaust gas recirculation completely after the rate of flow of the exhaust gases being recirculated has gradually decreased with the increase of the pressure inside the air intake passage, there is no possibility of the exhaust gas recirculation being abruptly interrupted and, since the rate of flow of the exhaust gas being recirculated gradually decreases, any possible occurrence of the abrupt change in torque can be avoided, thereby improving the drivability.

Furthermore, since the EGR system of this invention is so constructed that the supercharged pressure can gradually increase while the exhaust gas recirculation is performed, the emission of smoke can be suppressed and the region in which the exhaust gas recirculation is to be performed can be enlarged and, therefore, the emission of both the smoke and the $NO_x$ component can effectively be minimized.

The EGR system according to the foregoing embodiment of this invention is such that a time lag is provided only when the exhaust gas recirculation is to be interrupted. This is for the purpose of initiating the exhaust gas recirculation to minimize the emission of the $NO_x$ component as small as possible immediately after the engine operating condition has fallen in one of the EGR regions because the latter are set according to the engine operating condition in dependence on outputs from sensors for detecting engine operating conditions such as the engine speed and the load, and also for the purpose of enlarging the EGR region as large as possible to minimize the emission of the $NO_x$ component when the engine operating condition comes out of the EGR region.

However, even in the construction shown in and described with reference to FIGS. 1 and 2, the problems associated with the development of the excessive negative pressure and the abrupt change in torque during the change-over, are still left unsolved. Accordingly, as is the case for the interruption of the exhaust gas recirculation as hereinbefore described, a time lag may be provided when the exhaust gas recirculation is to be initiated. In such case, it is necessary to allow the throttle valve to be closed subsequent to the opening of the EGR control valve. This can be accomplished by, as shown in FIG. 4, providing third and fourth delay valve assemblies 31 and 32, similar in construction to the delay valve assemblies shown in FIGS. 1 and 2, between the three-way valve 19 and the EGR control valve 9 and between the three-way valve 19 and the second diaphragm valve assembly 14, and also providing a reverse-direction delay valve assembly 33 between the three-way valve 18 and the first diaphragm valve assembly 8.

Figure 4:
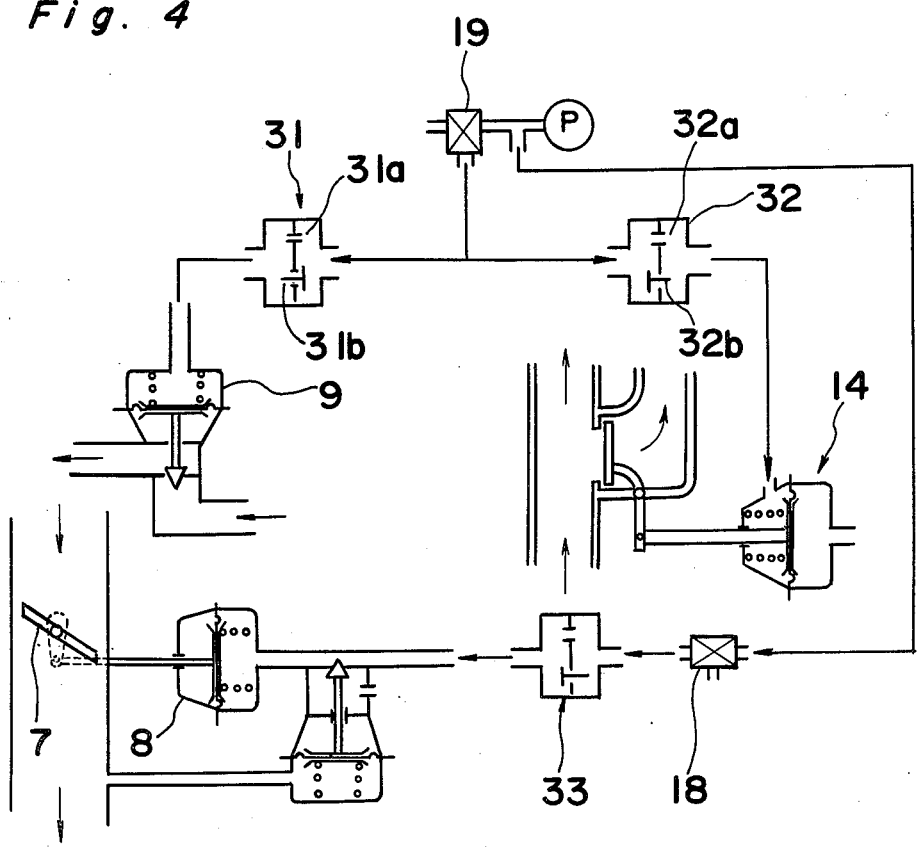
FIG. 4 is a schematic diagram showing an essential portion of the system according to another preferred embodiment of this invention.

Specifically, in the embodiment shown in FIG. 4, it is, however, to be noted that the aperture or orifice 31a in the third delay valve assembly 31 should be of a bore size smaller than that of the aperture or orifice 32a in the fourth delay valve assembly 32 while the sum of respective surface areas of the apertures or orifices 31a and 31b in the third delay valve assembly 31 should be greater than the sum of respective surface areas of the apertures or orifices 32a and 32b in the fourth delay valve assembly 32. In the construction shown in FIG. 4, when the exhaust gas recirculation is to be interrupted, the opening of the throttle valve 7 is followed by the closure of the west gate valve 12 which is in turn followed by the closure of the EGR control valve 9 as described in connection with the preceding embodiment. However, when the exhaust gas recirculation is to be initiated, and when the engine operating condition is to be brought in the region with the EGR control valve 9 and the throttle valve 7 opened and closed, respectively, the opening of the EGR control valve 9 is followed by the opening of the west gate valve 12 which is in turn followed by the closure of the throttle valve 7.

With the construction shown in and described with reference to FIG. 4, since the throttle valve is closed after the exhaust gas recirculation has been initiated when the exhaust gas recirculation is to be initiated, there is no possible development of the pressure in the air intake passage downstream of the throttle valve to an excessive negative pressure, and since the rate of flow of the exhaust gases to be recirculated can increase gradually, no reduction in drivability which would result from the abrupt change in torque take place.

Although this invention has fully been described in connection with the preferred embodiments thereof with reference to the accompanying drawings, it is to be noted that various changes and modifications are apparent to those skilled in the art. For example, although in any one of the foregoing embodiments the time lag has been described as provided by the use of the mechanical delay valve assemblies, an electric delay circuit may be used for the same purpose. In such case, the delay circuit may be incorporated in an operating signal generator, i.e., the microcomputer 15 so far shown and described, for the control of the three-way valves used to control the negative pressure to be applied to the various diaphragm valve assemblies.

Accordingly, unless such changes and modifications depart from the scope of this invention as defined in the appended claims, they should be construed as included therein.

We claim:

1. In an automotive power plant comprising a diesel engine having an air intake passage means and an exhaust passage means, an EGR passage means extending between the air intake passage means and the exhaust passage means, an EGR control valve for selectively closing and opening the EGR passage means, a first actuator for driving the EGR control valve, means for regulating the flow of air being sucked through the air intake passage means, and a second actuator for driving the regulating means, said EGR control valve when opened during a particular engine operating condition permitting a portion of exhaust gases emitted from the engine to be recirculated therethrough by way of the EGR passage means while the regulating means is operated to reduce the rate of flow of the air through the air intake passage means, the improvement which comprises a detector device for detecting an operating condition of the engine and a control device operable in response to an output from the detector device to control the operation of the first and second actuators, said control device having a time lag providing means for delaying the operation of the first actuator relative to the operation of the second actuator thereby to open the EGR control valve after the increase of the rate of flow of the air being sucked through the air intake passage means when the circulation of the exhaust gases through the EGR passage means is to be interrupted.

2. A power plant as claimed in claim 1, wherein the first actuator is constituted by a negative pressure responsive actuator, and further comprising a negative pressure passage connecting the actuator to a source of negative pressure, the time lag providing means in the form of a delay valve assembly being disposed in the negative pressure passage.

3. A power plant as claimed in claim 1, wherein the regulating means is comprised of a throttle valve disposed in the air intake passage means at a position upstream of the opening of the EGR passage means into the air intake passage means.

4. A power plant as claimed in claim 1, further comprising a supercharger including a blower displaced in the air intake passage means, and a third actuator, and wherein the regulating means comprises a throttle valve disposed in the air intake passage means at a position downstream of the blower and upstream of the opening of the EGR passage means into the air intake passage means, said third actuator when the recirculation of the exhaust gas is to be initiated, causing the throttle valve to close a predetermined degree and also controlling the supercharger to reduce a supercharged pressure.

5. A power plant as claimed in claim 4, wherein the supercharger is a turbocharger and also includes an exhaust gas turbine disposed in the exhaust passage means, and said exhaust passage means having a bypass passage bypassying the turbine, said bypass passage having a west gate valve, said third actuator being an actuator for driving the west gate valve.

6. A power plant as claimed in claim 4 or 5, the time lag providing means is so constructed as to operate the second actuator, then the third actuator and finally the first actuator when the exhaust gas recirculation is to be interrupted.

7. A power plant as claimed in claim 1, wherein the time lag providing means includes means for delaying the operation of the first actuator relative to the operation of the second actuator when the exhaust gas recirculation is to be interrupted, and for delaying the operation of the second actuator relative to the first actuator when the exhaust gas recirculation is to be initiated.

8. A power plant as claimed in claim 4 or 5, wherein the time lag providing means operates the first actuator, then the third actuator and finally the second actuator when the exhaust gas recirculation is to be initiated.

* * * * *